United States Patent [19]

Joulin

[11] Patent Number: 5,035,568
[45] Date of Patent: Jul. 30, 1991

[54] SUCTION GRIPPER DEVICE AND OBJECT TRANSFER DEVICE

[75] Inventor: Michel Joulin, Morigny, France

[73] Assignee: Joulin Aero Distribution S.A.R.L., Etampes, France

[21] Appl. No.: 452,648

[22] Filed: Dec. 19, 1989

[30] Foreign Application Priority Data

Dec. 19, 1988 [SE] Sweden .................................. 8804571

[51] Int. Cl.$^5$ .............................................. B66C 1/02
[52] U.S. Cl. .................................. 414/752; 294/64.1; 414/793; 414/797
[58] Field of Search ............... 414/793, 797, 225, 627, 414/737, 752; 901/40; 294/64.1, 65

[56] References Cited

U.S. PATENT DOCUMENTS

| | | | |
|---|---|---|---|
| 3,523,707 | 8/1970 | Roth | 294/95 |
| 3,845,950 | 11/1974 | Kuzniak | 414/793 X |
| 3,848,752 | 11/1974 | Branch et al. | 414/793 X |
| 4,079,645 | 3/1978 | Nunes et al. | 414/793 X |
| 4,155,583 | 5/1979 | Mikos et al. | 294/65 |
| 4,674,785 | 6/1987 | Riesenberg | 294/65 |
| 4,703,966 | 11/1987 | Lewecke et al. | 294/65 |

FOREIGN PATENT DOCUMENTS 717097  10/1966  Italy .................................. 414/793

Primary Examiner—Frank E. Werner
Assistant Examiner—James Ellca
Attorney, Agent, or Firm—Sughrue, Mion, Zinn, Macpeak & Seas

[57] ABSTRACT

A suction gripper device for transfer of boards and other substantially flat objects includes a suction plate having at its underside suction openings that are closable by way of calibrated flaps. The plate is connected with a vacuum vessel through a closable vacuum opening on the one hand, and on the other hand, through a calibrated opening that serves to effect a controlled leakage to keep the vacuum within the vacuum vessel at a pre-defined maximum value.

1 Claim, 3 Drawing Sheets

SUCTION GRIPPER DEVICE AND OBJECT TRANSFER DEVICE

FIELD OF THE INVENTION

This invention is related to a suction gripper device for substantially flat objects, such as wooden boards, panels, beams, slabs or any other equivalent article, of wood or of any material.

BACKGROUND OF THE INVENTION

Many suction gripper devices are known in the prior art, comprising a suction plate having at its underside surface, suction openings that can be sealed by calibrated flaps and are connected to low pressure means. Such devices have been the object of many improvements in order to facilitate the holding of objects distorted by twisting, or featuring splits or irregular edges. The inner surface of the plate generally comprises a plurality of openings, from several tens to several hundreds of them, to allow suction and therefore to allow the opposite object to lie flat on it. In order to prevent excess air from entering through the opening covered by the flat object to be lifted, each opening is provided with a calibrated flap consisting of a vertically freely moving stem topped by one or more rubber or metal washers. The weight of such washers is adjusted so that flaps remain open when the air flow-rate through the respective opening is small and even non-existent, which is the case when an object lies flat against said opening. By contrast, when no object lies flat against given opening, the flap is sucked upwards and obturates the relevant opening.

In the case of large plates, a very large instantaneous flow-rate is required to lift all the flaps associated with the suction openings that are not obturated by the object to be lifted. More particularly, when the board is not large, it covers only a small portion of the openings and the flow-rate must be large enough to lift all the other flaps. To achieve this large instantaneous flow-rate, one solution is to provide a high-capacity vacuum pump. However, this results in having an oversized pump and it has been suggested in the prior art to insert a vacuum vessel betwen the pump and the suction plate. This vacuum vessel, through a closable conduit, is connected with the chamber delimited by the suction plate. This chamber delimited by a suction plate, through a second closable opening, is also connected with ambient air. The sequence of operations is as follows: first the vacuum opening and the air connection opening are closed. Therefore, the pump, creates a vacuum within the low-pressure vessel, of relatively large magnitude. When the suction plate is positioned above the object to be lifted, the sealing opening opens, which creates a strong draught within the chamber delimited by the suction plate, said draught being large enough to hold all flaps associated with the openings not covered by the object to be lifted lying flat in the sealing position.

During the next phase, the object is kept laying flat against the suction plate and a limited flow-rate is sufficient since all the openings of the underside surface of the plate are obturated by the flaps or the object to be lifted. The sole purpose of the air flow-rate required to maintain an adequate vacuum value is to make up for eventual leakages.

The third phase is the laying down of the object that has been held flat against the suction plate This is achieved by opening the conduit for connection with ambient air, which eliminates the vacuum inside the chamber delimited by the suction plate. This also eliminates the vacuum inside the vacuum vessel.

Obviously it could be considered to close the vacuum opening simultaneously or previously. However, this would be most detrimental to the longevity of the pump which would in this case work in this portion of its efficiency curve associated with low flow-rate and very large vacuum, that is, at limit capacity. For this portion of its efficiency curve, the pump requires a high power and its energy consumption is high. Also, an oversized motor should be required to prevent detrimental overheating both of motor and of mechanical components.

By contrast, it is possible to escape these disadvantages by leaving open the vacuum opening. But unfortunately, much time, several seconds in fact, is needed to rebuild vacuum, from the instant that the atmosphere connection opening is closed again to the instant when the vacuum prevailing inside the low-pressure vessel is again adequate to keep all flaps lying flat in their sealing position. To keep this rebuild time as short as possible, it is necessary to reduce volume, which cuts down the number of flaps and gives rise to safety problems (smaller reserve in case of power failure). Moreover, if the atmosphere connection opening is closed early and if the vacuum opening is not open when vacuum reaches the operating level, the above-mentioned problems are met again.

SUMMARY OF THE INVENTION

The purpose of this invention is to provide a simple solution, although it is diametrically opposed to the common knowledge of the man of the art, for the problem, This invention more particularly related to a suction gripper device for gripping substantially flat objects, having a suction plate comprising at its underside surface suction openings that are closable by calibrated flaps, said plate being connected through a closable opening with a vacuum vessel, which in turn is connected with a pump. Moreover, the vacuum vessel is connected with the suction plate through a controlled leakage maintaining the vacuum value inside the vacuum vessel at a pre-defined maximum. The purpose of the controlled leakage is to prevent the vacuum inside the vacuum vessel is to exceed a pre-defined value beyond which the pump runs in a range of low flow-rates and excessive low pressures. This condition is verified for whatever position of the closing means for vacuum and atmosphere connecting openings.

More particularly, when the vacuum opening is closed, the vacuum within the vacuum vessel arrives at its threshold value and remains there for any length of time. Therefore the suction gripper device is immediately ready to work and hold a new object without the requirement of rebuilding vacuum within the vessel. On the other hand, the vacuum opening ensures, prior to the holding of an object, a vacuum that is smaller than the operating level of the pump, thereby preventing an excessively strong draught that would undesirably close flaps near a suction opening, or flaps, the seals of which are not fully flat, as the relevant suction openings are covered in part only by the object to be lifted, although once the minimum vacuum has been reached at seal level, they become tight. The pre-defined value of normal operation vacuum within the vessel varies obviously with the characteristics of the pump utilized and this data is generally available from the maker of the pump. Of course the man of the art can calculate the value as well as the characteristics of the controlled leakage by means of calculation works pertaining to his normal know-how. However a more convenient approach is to connect the pump with a vacuum meter through a pipe having several calibrated holes the dimensions of which are known. The pump is started and one or more calibrated holes are sealed in succession until the low pressure reading at the vacuum meter has the desired value. It suffices to count how many holes are not sealed yet to find the necessary characteristics of the controlled leakage. According to this invention, the suction plate and the vacuum vessel may be connected by an means.

According to a preferred embodiment, the suction plate and the vacuum vessel are divided by a common wall having a first closable vacuum opening, a second closable atmosphere connection opening and a calibrated leakage opening.

According to a particular embodiment of this invention, the suction plate and the vacuum vessel form one compact caisson.

According to a preferred embodiment, the vacuum vessel is in form of a component of the machine, such as, for instance, a hollow supporting pole for the suction plate. It is possible in this way to reduce the weight of the device, as the hollow column associates the two purposes of carrying the suction plate and providing a vacuum vessel.

On the other hand, there is provided the possibility of a direct connection of the hollow column with the pump, thereby eliminating the use of long hoses which is normally linked with losses of efficiency.

This invention is also related to a transfer device for substantially flat objects that comprises a frame carrying a horizontally mobile carriage, said mobile carriage supporting a vertically mobile suction gripper device for transfer of substantially flat objects, said suction gripper device comprising a suction plate having, at its underside surface, suction openings that can be closed by calibrated flaps, said plate being connected with a vacuum vessel through a closable vacuum opening. The vacuum vessel is in form of a vertical hollow column cooperating with the mobile carriage and carrying the suction plate,. The vacuum chamber delimited by the hollow column is connected to the chamber delimited by the suction plate, by respectively a closable opening and a calibrated opening. Of course, the calibrated opening may be arranged on the closing means of said closable opening at at any place ensuring a connection between the vacuum storage and the suction plate.

The vertical motion of the column and suction plate assembly is ensured by mechanical or hydraulic means of known type.

BRIEF DESCRIPTION OF THE DRAWINGS

The features of the present invention will become apparent from the following detailed description with reference to the accompanying drawings which are given for the purpose of illustration alone and in which.

DESCRIPTION OF THE PREFERRED EMBODIMENT

Figure 1:
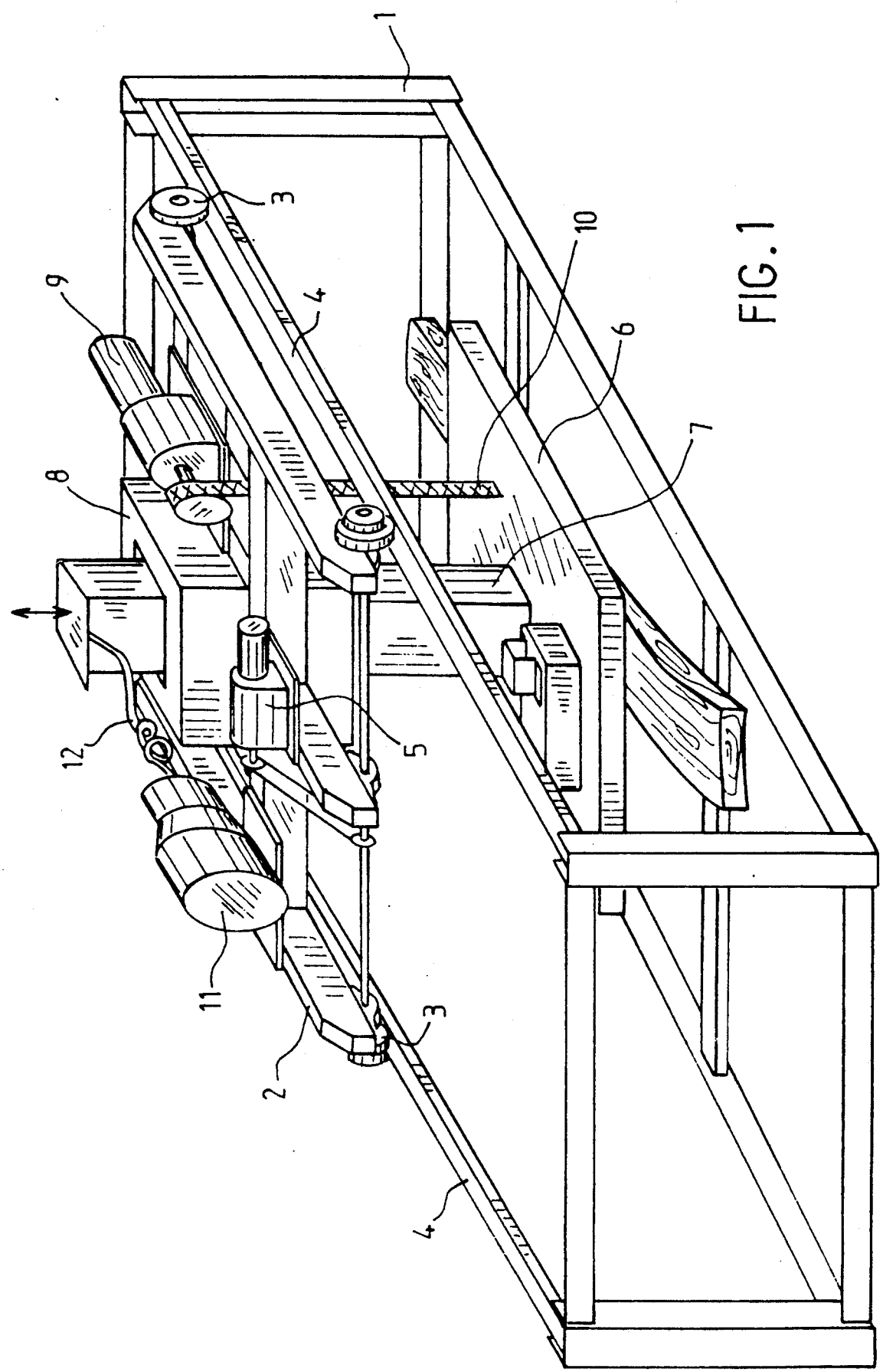
FIG. 1 is a perspective view of a transfer device.

The transfer device of substantially flat objects according to this invention comprises a frame 1 carrying a horizontally mobile carriage 2. By example, the mobile carriage 2 comprises wheel 3 co-operating with guide rails 4. Wheels are driven by an electric motor 5. Moreover the transfer device comprises a suction gripper device 6 that is supported by a column 7. The column 7 is vertically mobile with respect to the mobile carriage 2 and is held by a shaft 8. An electric motor 9 permits to vertically move the assembly consisting of the suction gripper device 6 and of the column 7 by means of a flexible band 10. The mobile carriage 2 also carried a suction pump 11 that is connected to the hollow column 7 through a flexible hose 12. The colum 7 is a hollow body sealed at both ends. The chamber delimited by the hollow column 7, is connected with the chamber delimited by the suction gripper device 6 by means of a suction opening and of a calibrated opening.

Figure 2:
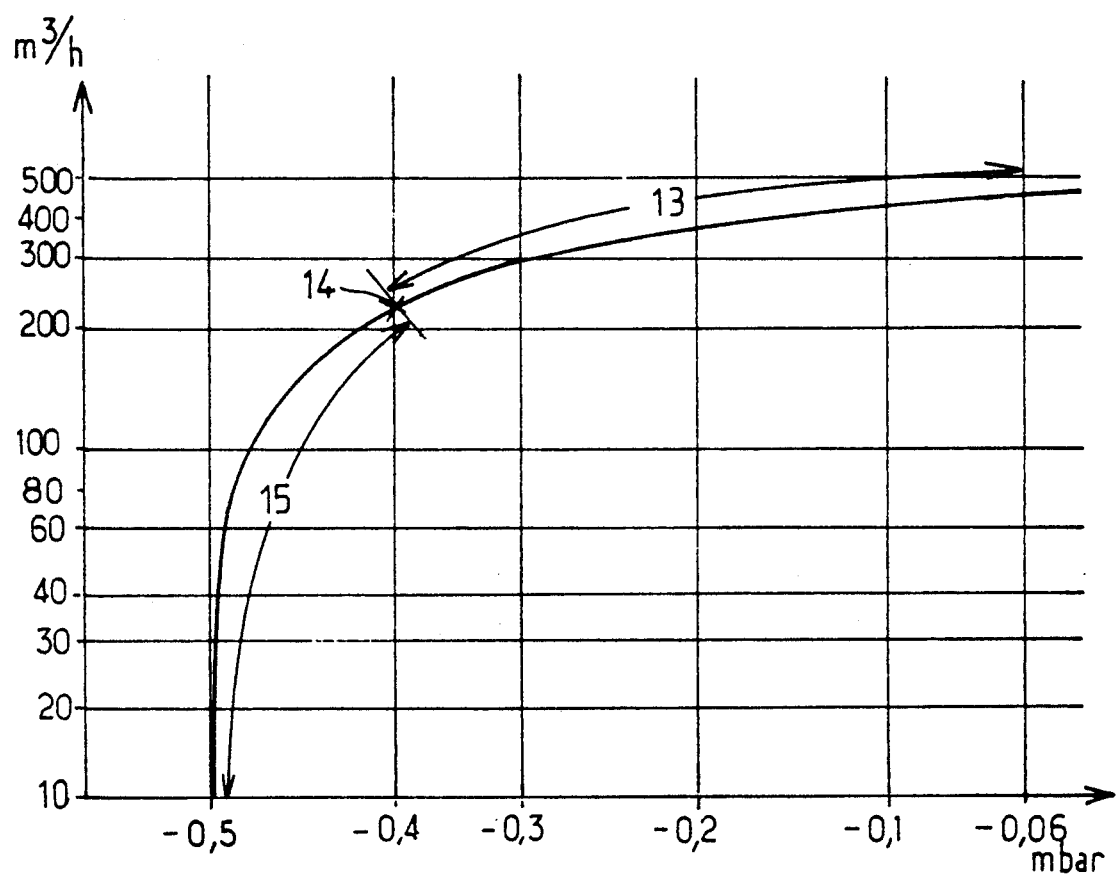
FIG. 2 is a flow rate/vacuum curve of a turbine.

FIG. 2 shows an example of a flow rate/vacuum curve as characteristic pump 11. The axis of abscisses of the chart shown in FIG. 2 refer to the vacuum created at turbine outlet. The axis is graduated from the right hand end, where the pressure value is approximately the usual atmospheric pressure toward the left hand end, in absolute value increments of vacuum. The ordinate axis is logarithmic and shows the flow rate of the pump, per hour, in cubic meters. The curve shows two sets of conditions, First, conditions represented by the right hand portion 13, located on the right of an operating point 14, refer to operation with high flow rates and small vacuum. Under these conditions, the power consumption of the pump is relatively low and its efficiency is at peak. The second set of conditions illustrated by the curve portion 15 referring to vacuum lower than the low pressure associated with the operating point 14 is related to small flow-rates and high vacuums. For these conditions, the electric energy taken by the pump is at its maximum and processes are released likely to cause damage or at least a reduction in the life of the pump. More particularly, there is an increased heating, and greater wear and the pumping phenomenon well known to the man of the art. The purpose of this invention is to prevent the pump from running at operating conditions beyond the point 14 in the area shown by the curve portion 15, under all circumstances.

Figure 3:
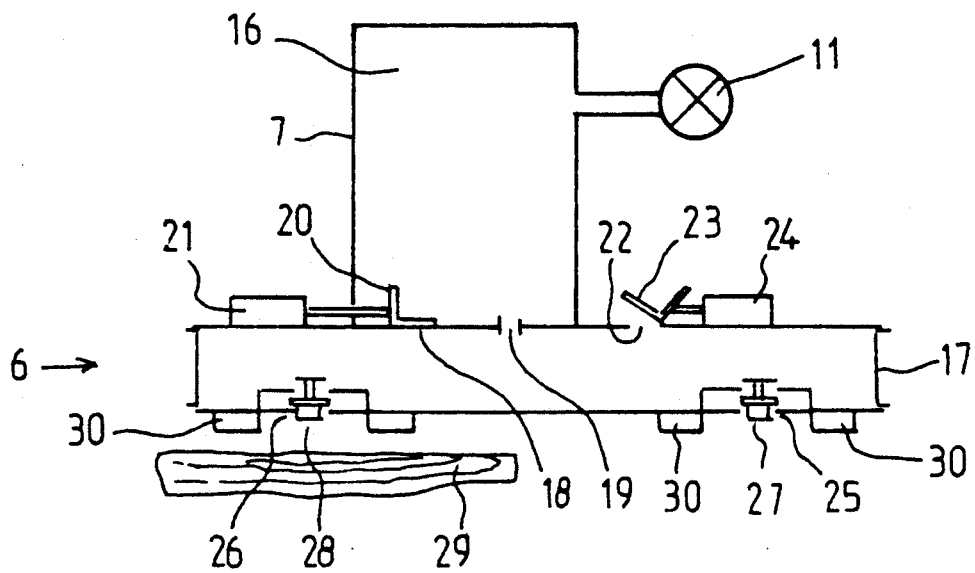
FIGS. 3, 4 are sectional views of a levitation device at different phases.

FIG. 3 is a diagrammatic section of a levitation device according to this invention. It comprises a hollow column 7, that defines a chamber serving as vacuum vessel 16, connected with the pump 11. The suction plate 17 defines an inner chamber connected with the vacuum vessel 16 through a suction opening 18 on the one hand, and through a calibrated opening 19 on the other hand. The suction inlet 18 can be sealed by a sealing flap 20 actuated by mechanical means such as a hydraulic jack 21. It may be of advantage to provide the calibrated opening 19 on the sealing flap 20. The inner area of the suction plate 17 can be connected with ambient atmosphere through an air vent 22 that is closable by a sealing flap 23 actuated by mechanical means such as a hydraulic jack. The suction plate 17 at its underside comprises suction openings 25, 26, that can be closed by calibrated flaps. The operation of these calibrated flaps is known to the man of the art. They consist of metal and rubber washers topped by a stem that can slide freely in the vertical direction. Their weight is set so that they remain in their lower position in which they do not seal the suction opening when the flow rate is low, which is the case particularly when a flat object is lying tight against the underside of the suction plate 17 in the zone of said suction opening 26. By contrast, when no object is present opposite said suction opening 26, the high flow rate resulting from the eventual vacuum prevailing inside the suction plate 17 causes the rising of the calibrated flap 27, 28 and in consequence the sealing of the concerned suction openings. In addition, the inner surface of the suction plate 17 has elastic means 30, for example, foam, having individual cells connected with the suction openings 25, 26. FIG. 3 shows the suction gripper in the phase of laying down a flat object 29. The atmosphere connection opening 22 is open and allows a direct communication between the inner area of the plate 17 and ambient air. By reason of the pressure of the calibrated opening 19, the opening 22 must be sized in order to, allow flow rates resulting from the permanent leakage via the calibrated opening 19. The pressure existing inside the suction plate is then near atmospheric pressure and the flat object 29, originally held by the suction gripper device 6, releases from the underside of the plate 17 by gravity. Since the pressure is near zero, suction flaps 27, 28 fall down by gravity and therefore keep the suction openings 25, 26 in an opened position. The vacuum opening 18 is kept sealed by the flap 20. However, the calibrated opening 19 provides a controlled leakage preventing the vacuum existing in the vacuum vessel 16 to exceed in absolute value a threshold value beyond which the pump runs under conditions of severe vacuum/low flow rate. Therefore, the vacuum inside the volume 7 is permanently kept around a value, corresponding to the pre-defined operating point 14. In the systems pertaining to the state of the art, the vacuum opening 18 must be kept open during the object release phase to prevent the vacuum inside the vacuum vessel 16 to rise to unacceptable levels.

Figure 4:
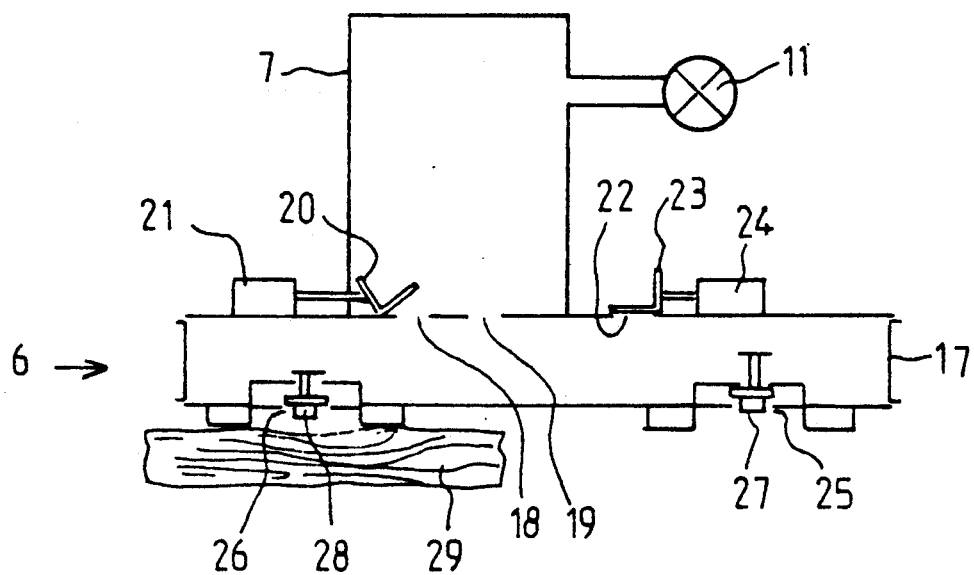

FIG. 4 shows the suction gripper device in the position of seizing a flat object 29. The suction gripper plate 6 is close to the flat object to be taken. The atmosphere connection conduit 22 is sealed by the flap 23. The vacuum opening 18 is open by reason of retraction of the flap 20, which causes a vacuum and a high air flow in the chamber defined by the plate 17. This causes the flat object 29 to to be sucked flat against the underside of the plate 17. All flaps 27 associated to suction openings 25 not covered by an object to be taken are sucked to their high position by reason of the strong flow of air and they cause a tight sealing of said suction openings 25. The leakages that cannot be prevented by reason of irregular configuration in the objects to be taken prevent vacuum from reaching unacceptable values.

Under no circumstances is this invention restricted to the example of embodiment described in order to have the operation of the device better understood. To the contrary, many alternative embodiments may be considered. More particularly, the calibrated opening 19 can be made in form of a hole or of a series of holes of any geometrical shape. Also, the closing means may utilize several techniques known to the man of the art.

I claim:

1. In a suction gripper device for gripping substantially flat objects comprising a suction plate (17) having an underside surface with suction openings therein closable by calibrated flaps, said suction plate being connected through a closable opening with a vacuum vessel (16) connected with a vacuum pump (11), the improvement wherein the vacuum vessel (16) is connected with the suction plate (17) by means providing a controlled leakage for maintaining normal operation vacuum within the vacuum vessel (16) at a pre-defined maximum value, wherein the suction plate (17) and the vacuum vessel (16) are separated by a common wall including a first vacuum opening (18), a second atmosphere connection opening of a closable type and a calibrated opening (19) for controlled leakage, said calibrated opening (19) comprising said controlled leakage means, and wherein said vacuum vessel (16) is a supporting hollow column (7) of the suction plate (17) connecting said suction plate (17) to said vacuum pump (11).

* * * * *